United States Patent
Takahara et al.

(10) Patent No.: US 7,579,765 B2
(45) Date of Patent: Aug. 25, 2009

(54) ORANGE-EMITTING PHOSPHOR

(75) Inventors: Takeshi Takahara, Tokyo (JP); Yasushi Aoki, Tokyo (JP); Takashi Murase, Tokyo (JP)

(73) Assignee: Nemoto & Company, Ltd., Tokyo (JP)

( * ) Notice: Subject to any disclaimer, the term of this patent is extended or adjusted under 35 U.S.C. 154(b) by 0 days.

(21) Appl. No.: 12/169,661

(22) Filed: Jul. 9, 2008

(65) Prior Publication Data
US 2008/0274029 A1 Nov. 6, 2008

Related U.S. Application Data

(63) Continuation-in-part of application No. 11/834,720, filed on Aug. 7, 2007, now abandoned.

(30) Foreign Application Priority Data

Oct. 6, 2006 (JP) ............................. 2006-275356

(51) Int. Cl.
*H01J 63/04* (2006.01)
(52) U.S. Cl. .................... 313/485; 313/486; 252/301.6; 252/301.4
(58) Field of Classification Search .......... 252/301.4 R, 252/301.4 F
See application file for complete search history.

(56) References Cited

U.S. PATENT DOCUMENTS

| 2005/0168127 A1 | 8/2005 | Shei et al. |
| 2007/0085466 A1* | 4/2007 | Shimomura et al. ......... 313/485 |

FOREIGN PATENT DOCUMENTS

| JP | 10-242513 | 9/1998 |
| JP | 2002-060747 | 2/2002 |
| JP | 2006-036943 | 2/2006 |
| JP | 2006-514152 | 4/2006 |

* cited by examiner

*Primary Examiner*—Melvin C Mayes
*Assistant Examiner*—Bijay S Saha
(74) *Attorney, Agent, or Firm*—Dennis G. LaPointe

(57) ABSTRACT

An orange-emitting phosphor that emits at a high luminance when being excited by blue light emitted by a blue light-emitting diode is provided. This orange-emitting phosphor is an alkaline-earth metal silicate-based phosphor represented by a general formula of $a(Sr_{1-x}Eu_{x(1-y)}Yb_{xy})O \cdot SiO_2$. In the formula, a is provided as $2.9 \leq a \leq 3.1$, x is provided as $0.005 \leq x \leq 0.10$, and y is provided as $0.001 \leq y \leq 0.1$. An orange-emitting phosphor that emits orange at a high luminance and produces no harmful gas is provided.

5 Claims, 1 Drawing Sheet

US 7,579,765 B2

ORANGE-EMITTING PHOSPHOR

RELATED APPLICATIONS

The present application is a continuation-in-part of U.S. patent application Ser. No. 11/834,720, filed Aug. 7, 2007, now abandoned which in turn in claims priority under 35 USC 119 to Japanese Patent Application No. 2006-275356 filed on Oct. 6, 2006.

FIELD OF THE INVENTION

The present invention relates to an orange-emitting phosphor that absorbs and emits light.

BACKGROUND OF THE INVENTION

Conventionally, it has been known to use phosphors that absorb visible light rays in a short wavelength region such as blue light rays and ultraviolet rays and convert these light rays in wavelength to visible lights with longer wavelengths such as red and green lights and obtain visible light such as white light by combining these phosphors.

In particular, as a light source of visible light rays in the short wavelength region or ultraviolet rays, known is a semiconductor light-emitting element, for example, a gallium nitride (GaN)-based blue light-emitting diode or the like. Moreover, a light-emitting element that is constructed in combination with a phosphor serving as a wavelength converting material to emit visible light such as white light features a small amount of power consumption and a long lifespan, and has therefore received attention as a light-emitting source of an image display device or a lighting system in recent years.

Moreover, for this light-emitting element, as described in, for example, Japanese Laid-Open Patent Publication No. 10-242513, a phosphor serving as a converting material absorbs visible light in the blue region emitted by a GaN-based blue light-emitting diode to emit yellow light, and emits white as a result of mixing with blue light of the light-emitting diode not absorbed in this phosphor.

However, this white light emission lacks color rendering properties as this is formed of light of a blue color and a yellow color being a complementary color of this blue color.

In addition, as a light-emitting element improved in color rendering properties of white light formed of light of these blue and yellow colors, as described in, for example, Japanese Laid-Open Patent Publication No. 2002-60747, known is one that forms white light by combination of a blue light-emitting diode, a green-emitting phosphor, and a red-emitting phosphor or an orange-emitting phosphor.

However, a stable phosphor that efficiently emits red or orange light upon excitation by irradiation of blue light is still as yet unknown. For example, an alkaline-earth metal sulfide phosphor by activation of divalent europium ($Eu^{2+}$) emits a reddish color, but easily undergoes a chemical change, and may produce a harmful sulfur compound such as a hydrogen sulfide gas. In particular, when a light-emitting diode is formed by this alkaline-earth metal sulfide-based phosphor, there is a problem such as corrosion of a surrounding material and the like.

In addition, as a phosphor that emits an orangish color, as disclosed in, for example, Japanese Laid-Open Patent Publication No. 2006-36943 or Japanese Translation of International Application No. 2006-514152, known is an alkaline-earth metal silicate phosphor by activation of divalent europium ($Eu^{2+}$) such as $Sr_3SiO_5$:Eu. However, this alkaline-earth metal silicate phosphor is not sufficient in luminance and has a problem that it is not easy to secure high luminance.

The present invention has been made in view of such problems, and it is an object of the present invention to provide an orange-emitting phosphor that emits at a high luminance.

SUMMARY OF THE INVENTION

An orange-emitting phosphor of the present invention is represented by a general formula of $a(Sr_{1-x}Eu_{x(1-y)}Yb_{xy})O \cdot SiO_2$, wherein a is $2.9 \leq a \leq 3.1$, x is $0.005 \leq x \leq 0.1$, and y is $0.001 \leq y \leq 0.1$.

According to the present invention, an orange-emitting phosphor that emits at a high luminance can be obtained.

DETAILED DESCRIPTION OF THE PREFERRED EMBODIMENT

Figure 1:
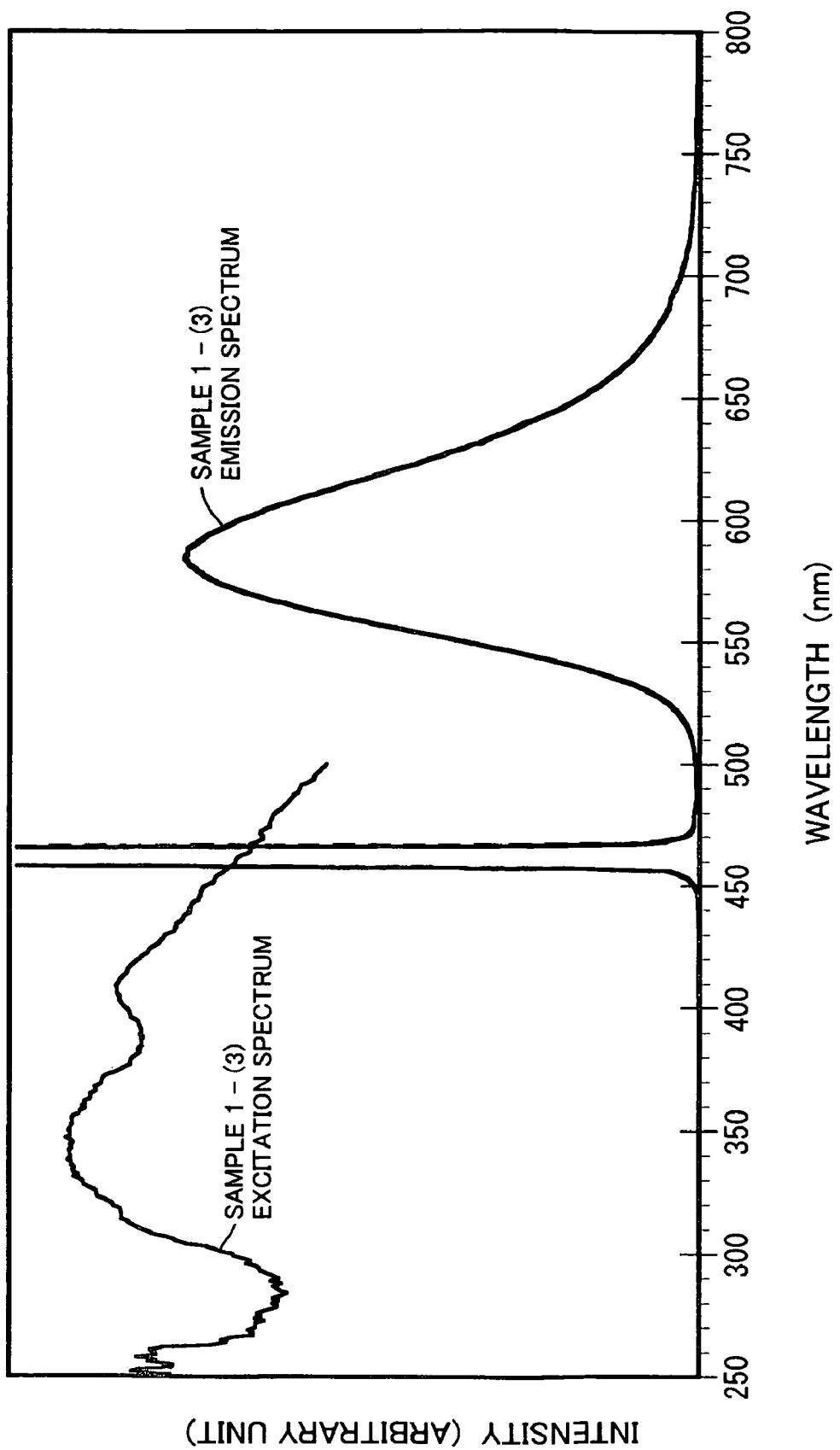
FIG. 1 is a graph showing an excitation spectrum and an emission spectrum of an orange-emitting phosphor of an embodiment of the present invention.

Hereinafter, processes for manufacturing an orange-emitting phosphor in an embodiment of the present invention will be described.

The orange-emitting phosphor of the present invention is obtained by mixing compounds containing component elements at a predetermined ratio and firing a mixture obtained by this mixing under predetermined conditions.

First, for a starting material of this orange-emitting phosphor, an oxide containing strontium (Sr), europium (Eu), and ytterbium (Yb) or a compound such as a carbonate, a nitrate, an oxalate, a hydroxide, a fluoride, or a chloride that is changed to an oxide by firing can be used.

In addition, as a material of silicon (Si), silica ($SiO_2$) can be used, however, besides this silicon, silicon nitride ($Si_3N_4$) may be used. And, when this silicon nitride is used, this is difficult to fuse under a high temperature at the time of firing, which thus enables firing at a higher temperature.

Moreover, the type and mixing ratio of these starting materials are selected according to the composition of an orange-emitting phosphor to be prepared.

Furthermore, the mixed starting materials are fired under predetermined conditions. The atmosphere at this time of firing is suitably a mixed gas atmosphere of hydrogen and nitrogen, and the concentration of hydrogen gas in this mixed gas atmosphere of hydrogen and nitrogen is suitably within a range of not less than 1% and not more than 5%.

In addition, the firing temperature at this time of firing is suitably not less than 1200° C. and not more than 1350° C., and when this firing temperature is less than 1200° C., the reaction speed of a solid-phase reaction of the starting materials is slowed. On the other hand, when this firing temperature exceeds 1350° C., the materials are significantly sintered and fused. This firing temperature is more suitably not less than 1250° C. and not more than 1300° C. At this time, when $Si_3N_4$ is used for the silica (Si) material, it becomes possible to raise the firing temperature to 1500° C., which thus allows firing at a higher temperature, whereby an orange-emitting phosphor further excellent in crystallinity and with a high luminance is provided.

Furthermore, the firing time at this time of firing is suitably 0.5 hours or more. That is, when this firing time is less than 0.5 hours, the solid-phase reaction is insufficient, so that satisfactory phosphor particles can no longer be obtained. In addition, this firing time is more suitably 1 hour or more.

An objective orange-emitting phosphor can be obtained by a solid-phase reaction as a result of conducting firing under these conditions. Immediately after this firing, the phosphor is usually in a state of agglomerated powder, and thus in order to use this powder-like phosphor as a phosphor for an LED, the synthesized powder-like phosphor is manufactured into a product of an orange-emitting phosphor with a predetermined particle size through treatment processes of dispersion and washing. When using $Si_3N_4$ as a part of the material of Si, $Si_3N_4$ is fused at the final stage of reaction, Si becomes a part of the phosphor, and N becomes NOx to be evaporated. In addition, because $Si_3N_4$ is fused at the final stage of reaction, the phosphors can be fired at a higher temperature of 1500° C. and are excellent in crystallinity, and this the luminance can be improved. A reaction to create the invention of the present application can be expressed by a chemical equation: $0.98SrCO_3 + 0.0097Eu_2O_3 + 0.0003Yb_2O_3 + 0.0556Si_3N_4 + 0.1663SiO_2 \rightarrow \frac{1}{3}\{3(Sr_{0.98}Eu_{0.0194}Yb_{0.0006})O \cdot SiO_2\} + 0.98CO_2\uparrow + 0.2224NO_x\uparrow$, $Si_3N_4$ is fused at the final stage of reaction, Si becomes a part of the phosphor, and N becomes NOx to be evaporated. Accordingly, N is not involved in the phosphor of the present invention.

Moreover, this orange-emitting phosphor absorbs visible light rays in the short wavelength region such as blue light rays and ultraviolet rays and emits visible light with a longer wavelength such as orange-light being within an emission peak wavelength range of not less than 570 nm and not more than 600 nm. Furthermore, this orange-emitting phosphor can construct a white light-emitting element improved in color rendering properties by combination with a semiconductor light-emitting element such as a light-emitting diode (LED) or a laser diode (LD).

Next, the construction and characteristics of an orange-emitting phosphor of the present invention will be described as an example of the first embodiment.

Example 1

To start with, description will be given of characteristics of an orange-emitting phosphor when x representing the total amount of europium (Eu) serving as an activator and ytterbium (Yb) serving as a coactivator has been changed.

First, 144.7 g (0.98 mols of Sr) of a strontium carbonate ($SrCO_3$) powder as being a material of strontium (Sr), 3.41 g (0.0194 mols of Eu) of a europium oxide ($Eu_2O_3$) powder as being a material of europium (Eu), 0.12 g (0.0006 mols of Yb) of an ytterbium oxide ($Yb_2O_3$) powder as being a material of ytterbium (Yb), and 20.0 g (0.333 mols of Si) of a silicon dioxide ($SiO_2$) powder as being a material of silicon (Si) are sufficiently well mixed.

Then, a mixture of these powders is filled inside an alumina container and was fired in an atmosphere of 3% hydrogen ($H_2$) plus 97% nitrogen ($N_2$) for 1 hour at 1300° C. After this firing, a phosphor obtained through a washing treatment and a dispersion treatment is provided as a phosphor of Sample 1-(3).

This phosphor of Sample 1-(3) is represented by a general formula: $3(Sr_{0.98}Eu_{0.0194}Yb_{0.0006})O \cdot SiO_2$. Here, y representing a ratio to substitute ytterbium (Yb) for a part of europium (Eu) is 0.03.

Similarly, phosphors were prepared under the same conditions as those of Sample 1-(3) except that y representing a ratio to substitute ytterbium (Yb) for a part of europium (Eu) was changed to 0.001, 0.01, 0.03, 0.07, 0.1, and 0.2 as shown in Table 1, and were provided as phosphors of Sample 1-(1), Sample 1-(2), and Sample 1-(4) to Sample 1-(6).

In addition, for comparison, a conventional phosphor that is excited by light in the blue region and emits light in the orange region to the red region, that is, a $Sr_3SiO_5$:Eu phosphor (general formula: $3(Sr_{0.98}Eu_{0.02})O \cdot SiO_2$) using no ytterbium (Yb), was prepared by the same method, and was provided as a phosphor of Comparative Example 1.

TABLE 1

| Sample | Yb substitution rate y | General formula |
|---|---|---|
| Comparative Example 1 | 0 | $3(Sr_{0.98}Eu_{0.02})O \cdot SiO_2$ |
| Sample 1-(1) | 0.001 | $3(Sr_{0.98}Eu_{0.01998}Yb_{0.00002})O \cdot SiO_2$ |
| Sample 1-(2) | 0.01 | $3(Sr_{0.98}Eu_{0.0198}Yb_{0.0002})O \cdot SiO_2$ |
| Sample 1-(3) | 0.03 | $3(Sr_{0.98}Eu_{0.0194}Yb_{0.0006})O \cdot SiO_2$ |
| Sample 1-(4) | 0.07 | $3(Sr_{0.98}Eu_{0.0186}Yb_{0.0014})O \cdot SiO_2$ |
| Sample 1-(5) | 0.1 | $3(Sr_{0.98}Eu_{0.018}Yb_{0.002})O \cdot SiO_2$ |
| Sample 1-(6) | 0.2 | $3(Sr_{0.98}Eu_{0.016}Yb_{0.004})O \cdot SiO_2$ |

Next, emission characteristics of the obtained phosphors of Sample 1-(1) to Sample 1-(6) and Comparative Example 1 were measured.

At this time, as the emission characteristics, an emission spectrum and an excitation spectrum were first measured, by use of Fluorescence Recording Spectrophotometer (Model: F-4500 Hitachi, Ltd.), by placing each of the samples in a powder sample cell with a silica glass window. The emission spectrum was measured by irradiating light in the blue region with an excitation wavelength of 465 nm, while the excitation spectrum was measured by using an emission wavelength of 590 nm as a monitor wavelength.

The excitation spectrum and the emission spectrum of Sample 1-(3) out of measurement results of these samples are shown in FIG. 1. It is understood that the phosphor of Sample 1-(3) has characteristics of, as shown in FIG. 1, being excited by light in the near-ultraviolet region to the blue region and efficiently emitting light in the orange region to the red region.

In addition, the emission spectrum of Comparative Example 1 not containing ytterbium (Yb) was almost the same as that of Sample 1-(3).

Furthermore, luminances were calculated from these emission spectra. Concretely, when the emission intensity at each wavelength λ was represented by P(λ), luminance B of each phosphor was calculated by use of numerical expression 1.

$$B = \frac{\int_{470}^{700} P(\lambda)V(\lambda)d\lambda}{\int_{470}^{700} P(\lambda)d\lambda}$$

Numerical Expression 1

Here, V(λ) in this numerical expression 1 indicates standard luminous efficiency, and the integration range of the wavelength λ was provided as a range of not less than 470 nm and not more than 700 nm. As a result, the obtained luminance B was shown in Table 2 as a relative luminance to luminance of Comparative Example 1 provided as 100.

TABLE 2

| Sample | Yb substitution rate y | Relative luminance |
|---|---|---|
| Comparative Example 1 | 0 | 100 |
| Sample 1-(1) | 0.001 | 102 |
| Sample 1-(2) | 0.01 | 112 |
| Sample 1-(3) | 0.03 | 120 |
| Sample 1-(4) | 0.07 | 108 |
| Sample 1-(5) | 0.1 | 102 |
| Sample 1-(6) | 0.2 | 95 |

As shown in Table 2, it was understood that, in the case of Sample 1-(1) to Sample 1-(5) where y representing a ratio to substitute ytterbium (Yb) for a part of europium (Eu) was not less than 0.001 and not more than 0.1, the relative luminance was improved from that of Comparative Example 1. Furthermore, it was understood that, in the case where y was not less than to not more than 0.07, the relative luminance was further improved.

However, in the case where y was less than 0.001, there was no great difference in relative luminance from Comparative Example 1, and in the case of Sample 1-(6) where y was 0.2 exceeding 0.1, the relative luminance was lowered.

As a result, it was understood that, in the case where y representing a ratio to substitute ytterbium (Yb) for a part of europium (Eu) was not less than 0.001 and not more than 0.1, the luminance is improved, and in the case where y is not less than 0.01 and not more than 0.07, the luminance is further improved.

Example 2

Next, description will be given of characteristics of an orange-emitting phosphor in the case where a total amount x of europium (Eu) and ytterbium (Yb) has been changed.

As shown in Table 3, phosphors were prepared by the same manufacturing method as that of Example 1 except that y representing a ratio to substitute ytterbium (Yb) for a part of europium (Eu) was fixed to 0.03 and the total amount x of europium (Eu) and ytterbium (Yb) was changed to not less than 0.005 and not more than 0.15, and were provided as phosphors of Sample 2-(1) to Sample 2-(5).

Then, luminances of the obtained Sample 2-(1) to Sample 2-(5) were measured by the same method as that of Example 1, and results of this measurement are shown in Table 4 as relative luminances to that of Comparative Example 1 together with that of Sample 1-(3).

TABLE 4

| Sample | Eu concentration | Yb concentration | Eu + Yb concentration x | Relative luminance |
|---|---|---|---|---|
| Sample 2-(1) | 0.00485 | 0.00015 | 0.005 | 102 |
| Sample 2-(2) | 0.0097 | 0.0003 | 0.01 | 110 |
| Sample 1-(3) | 0.0194 | 0.0006 | 0.02 | 120 |
| Sample 2-(3) | 0.0291 | 0.0009 | 0.03 | 115 |
| Sample 2-(4) | 0.097 | 0.003 | 0.1 | 102 |
| Sample 2-(5) | 0.1455 | 0.0045 | 0.15 | 70 |

As a result, as shown in Table 4, it was understood that, when y representing a ratio to substitute ytterbium (Yb) for a part of europium (Eu) was 0.03 and the total amount x of europium (Eu) and ytterbium (Yb) was changed, in the case of Sample 2-(1) to Sample 2-(4) where this total amount x was not less than 0.005 and not more than 0.1, the relative luminance was improved in comparison with that of Comparative Example 1. In particular, in the case of Sample 2-(2) to Sample 2-(3) where x was not less than 0.01 and not more than 0.03, since the relative luminance becomes 110 or more, the luminance was further improved. However, in the case of Sample 2-(5) where the total amount x of europium (Eu) and ytterbium (Yb) exceeds 0.1, the luminance was lowered by concentration quenching.

Example 3

Next, description will be given of characteristics of an orange-emitting phosphor in the case where a representing a ratio of an alkaline-earth metal oxide of a phosphor host has been changed.

As shown in Table 5, phosphors were prepared by the same manufacturing method as that of Example 1 except that the total amount x of europium (Eu) and ytterbium (Yb) was provided as 0.015, y representing a ratio to substitute ytterbium (Yb) for a part of europium (Eu) was provided as 0.03, and a in the general formula of $a(Sr_{1-x}Eu_{x(1-y)}Yb_{xy})O \cdot SiO_2$ was changed to not less than 2.85 and not more than 3.15, and were provided as phosphors of Sample 3-(1) to Sample 3-(7).

TABLE 3

| Sample | Eu concentration | Yb concentration | Eu + Yb concentration x | General formula |
|---|---|---|---|---|
| Sample 2-(1) | 0.00485 | 0.00015 | 0.005 | $3(Sr_{0.98}Eu_{0.00485}Yb_{0.00015})O \cdot SiO_2$ |
| Sample 2-(2) | 0.0097 | 0.0003 | 0.01 | $3(Sr_{0.98}Eu_{0.0097}Yb_{0.0003})O \cdot SiO_2$ |
| Sample 2-(3) | 0.0291 | 0.0009 | 0.03 | $3(Sr_{0.98}Eu_{0.0291}Yb_{0.0009})O \cdot SiO_2$ |
| Sample 2-(4) | 0.097 | 0.003 | 0.1 | $3(Sr_{0.98}Eu_{0.097}Yb_{0.003})O \cdot SiO_2$ |
| Sample 2-(5) | 0.1455 | 0.0045 | 0.15 | $3(Sr_{0.98}Eu_{0.1455}Yb_{0.0046})O \cdot SiO_2$ |

TABLE 5

| Sample | a | General formula |
|---|---|---|
| Sample 3-(1) | 2.85 | $2.85(Sr_{0.985}Eu_{0.01455}Yb_{0.00045})O \cdot SiO_2$ |
| Sample 3-(2) | 2.9 | $2.9(Sr_{0.985}Eu_{0.01455}Yb_{0.00045})O \cdot SiO_2$ |
| Sample 3-(3) | 2.95 | $2.95(Sr_{0.985}Eu_{0.01455}Yb_{0.00045})O \cdot SiO_2$ |
| Sample 3-(4) | 3 | $3(Sr_{0.985}Eu_{0.01455}Yb_{0.00045})O \cdot SiO_2$ |
| Sample 3-(5) | 3.05 | $3.05(Sr_{0.985}Eu_{0.01455}Yb_{0.00045})O \cdot SiO_2$ |
| Sample 3-(6) | 3.1 | $3.1(Sr_{0.985}Eu_{0.01455}Yb_{0.00045})O \cdot SiO_2$ |
| Sample 3-(7) | 3.15 | $3.15(Sr_{0.985}Eu_{0.01455}Yb_{0.00045})O \cdot SiO_2$ |

Then, luminances of the obtained Sample 3-(1) to Sample 3-(7) were measured by the same method as that of Example 1, and results of this measurement are shown in Table 6 as relative luminances to that of Comparative Example 1.

TABLE 6

| Sample | a | Relative luminance |
|---|---|---|
| Sample 3-(1) | 2.85 | 95 |
| Sample 3-(2) | 2.9 | 102 |
| Sample 3-(3) | 2.95 | 112 |
| Sample 3-(4) | 3 | 116 |
| Sample 3-(5) | 3.05 | 107 |
| Sample 3-(6) | 3.1 | 102 |
| Sample 3-(7) | 3.15 | 93 |

As a result, as shown in Table 6, in the case of Sample 3-(1) where a representing a ratio of an alkaline-earth metal oxide of a phosphor host was changed is less than 2.9, orange light emission luminance when being excited by light in the blue region was lowered. In addition, in the case of Sample 3-(7) where a exceeds 3.1, absorption of excitation light at the time of firing was reduced, efficiency of the phosphor was lowered, and thus emission luminance was lowered.

As described above, the phosphor prepared by adding europium as an activator and further by adding ytterbium as a coactivator to an alkaline-earth metal silicate becomes an orange-emitting phosphor that has a high degree of safety without producing a harmful gas or the like and emits light in the orange region at a high luminance, in particular, when being excited by light in the blue region.

Generally, it has been known that divalent ytterbium ($Yb^{2+}$) usually shows emission by an f-d transition from $4f^{13}5d$ to $4f^{14}$, and the emission peak wavelength is dependent on a phosphor host, while with regard to an orange-emitting phosphor represented by a general formula of $a(Sr_{1-x}Eu_{x(1-y)}Yb_{xy})O \cdot SiO_2$, it could be confirmed that no new light emission is observed even when ytterbium (Yb) elements are introduced into this orange-emitting phosphor, and for divalent europium ($Eu^{2+}$) being the other luminescence center, an orange light emission by an f-d transition from $4f^65d$ to $4f^7$ is enhanced.

That is, in this orange-emitting phosphor, divalent ytterbium ($Yb^{2+}$) shows a sensitization effect on emission of divalent europium ($Eu^{2+}$).

Moreover, when y representing a ratio to substitute ytterbium (Yb) being a coactivator for a part of europium (Eu) being an activator is 0.001 or less, the effect of this substitution of ytterbium (Yb) for a part of europium (Eu) is no longer exhibited. In addition, when this y exceeds 0.1, emission luminance is lowered.

Furthermore, when x representing a total amount of europium (Eu) and ytterbium (Yb) exceeds 0.1, luminance intensity is lowered by concentration quenching. In addition, when this x is less than 0.005, since the concentration of the activator is insufficient, emission luminance is lowered.

On the other hand, when a representing a ratio of an alkaline-earth metal oxide of a phosphor host is less than 2.9, orange light emission luminance when being excited by light in the blue region is lowered. In addition, when a exceeds 3.1, absorption of excitation light at the time of firing is reduced, efficiency of the phosphor is lowered, whereby emission luminance is lowered.

Therefore, by providing a representing a ratio of an alkaline-earth metal oxide of a phosphor host as $2.9 \leqq a \leqq 3.1$, providing x representing a total amount of europium (Eu) and ytterbium (Yb) as $0.005 \leqq x \leqq 0.10$, and providing y representing a ratio to substitute ytterbium (Yb) for a part of europium (Eu) as $0.001 \leqq x \leqq 0.1$, an orange-emitting phosphor that has a high degree of safety without producing a harmful gas or the like and emits orange at a high luminance, can be provided.

Example 4

Next, description will be given of characteristics of an orange-emitting phosphor when silicon nitride ($Si_3N_4$) has been used as a silicon (Si) material. As in the foregoing, when $Si_3N_4$ is used as the silicon (Si) material, it becomes possible to raise the firing temperature to 1500° C. or more.

First, 144.7 g (0.98 mols of Sr) of a strontium carbonate ($SrCO_3$) powder as being a material of strontium (Sr), 3.41 g (0.0194 mols of Eu) of a europium oxide ($Eu_2O_3$) powder as being a material of europium (Eu), 0.12 g (0.0006 mols of Yb) of an ytterbium oxide ($Yb_2O_3$) powder as being a material of ytterbium (Yb), and 7.81 g (0.167 mols of Si) of a silicon nitride ($Si_3N_4$) powder and 9.99 g (0.1663 mols of Si) of a silicon dioxide ($SiO_2$) powder as being a material of silicon (Si) were sufficiently well mixed.

Then, a mixture of these powders was filled inside an alumina container and was fired in an atmosphere of 3% hydrogen ($H_2$) plus 97% nitrogen ($N_2$) being a reducing atmosphere for 3 hours at 1500° C. After this firing, a phosphor obtained through a washing treatment and a dispersion treatment was provided as a phosphor of Sample 4-(3).

This phosphor of Sample 4-(3) is represented by a general formula: $3(Sr_{0.98}Eu_{0.0194}Yb_{0.0006})O \cdot SiO_2$. Here, y representing a ratio to substitute ytterbium (Yb) for a part of europium (Eu) is 0.03.

Similarly, phosphors were prepared under the same conditions as those of Sample 4-(3) except that y representing a ratio to substitute ytterbium (Yb) for a part of europium (Eu) was changed to 0.001, 0.01, 0.03, 0.07, 0.1, and 0.2 as shown in Table 7, and were provided as phosphors of Sample 4-(1), Sample 4-(2), and Sample 4-(4) to Sample 4-(6).

TABLE 7

| Sample | Yb substitution rate y | General Formula |
|---|---|---|
| Sample 4-(1) | 0.001 | $3(Sr_{0.98}Eu_{0.01998}Yb_{0.00002})O \cdot SiO_2$ |
| Sample 4-(2) | 0.01 | $3(Sr_{0.98}Eu_{0.0198}Yb_{0.0002})O \cdot SiO_2$ |
| Sample 4-(3) | 0.03 | $3(Sr_{0.98}Eu_{0.0194}Yb_{0.0006})O \cdot SiO_2$ |
| Sample 4-(4) | 0.07 | $3(Sr_{0.98}Eu_{0.0186}Yb_{0.0014})O \cdot SiO_2$ |
| Sample 4-(5) | 0.1 | $3(Sr_{0.98}Eu_{0.018}Yb_{0.002})O \cdot SiO_2$ |
| Sample 4-(6) | 0.2 | $3(Sr_{0.98}Eu_{0.016}Yb_{0.004})O \cdot SiO_2$ |

Next, emission characteristics of the obtained phosphors of Sample 4-(1) to Sample 4-(6) were measured in the same manner as that of Example 1, and the results are shown in Table 8 as relative luminances to the luminance of Comparative Example 1 provided as 100.

TABLE 8

| Sample | Yb substitution rate y | Relative luminance |
|---|---|---|
| Comparative Example 1 | 0 | 100 |
| Sample 4-(1) | 0.001 | 121 |
| Sample 4-(2) | 0.01 | 126 |
| Sample 4-(3) | 0.03 | 130 |
| Sample 4-(4) | 0.07 | 114 |
| Sample 4-(5) | 0.1 | 105 |
| Sample 4-(6) | 0.2 | 96 |

As shown in Table 8, it is understood that, in the case of Sample 4-(1) to Sample 4-(6) where $Si_3N_4$ was used for half of the material of silicon (Si), the phosphors can be fired at a higher temperature of 1500° C. and are further excellent in crystallinity, and thus, in comparison with Comparative Example 1 and Sample 1-(1) to Sample 1-(6) shown in Table 2, have further excellent luminances.

By thus using $Si_3N_4$ for a part of the silicon (Si) material, an orange-emitting phosphor with a higher luminance can be manufactured.

Although, in the present example, the ratio to use $Si_3N_4$ as a silicon (Si) material has been set to half of the amount of Si, a preferred range of the ratio of $Si_3N_4$ is 30% or more and 70% or less. If the ratio of $Si_3N_4$ is less than 30%, effects of $Si_3N_4$ used for a part of the silicon (Si) material are not displayed, and if the ratio of $Si_3N_4$ exceeds 70%, there is a problem of a dark coloration of a body color assumed to be due to a residue of nitrogen atoms. In other words, the mol % of Si atoms by $Si_3N_4$ to all Si atoms required for the phosphor of the invention of the present application is 30% or more and 70% or less.

Example 5

Next, description will be given of characteristics of an orange-emitting phosphor in the case where zirconium (Zr) has been substituted for a part of silicon (Si).

First, 144.7 g (0.98 mols of Sr) of a strontium carbonate ($SrCO_3$) powder as being a material of strontium (Sr), 3.41 g (0.0194 mols of Eu) of a europium oxide ($Eu_2O_3$) powder as being a material of europium (Eu), 0.12 g (0.0006 mols of Yb) of an ytterbium oxide ($Yb_2O_3$) powder as being a material of ytterbium (Yb), 7.81 g (0.167 mols of Si) of a silicon nitride ($Si_3N_4$) powder and 9.98 g (0.1661 mols of Si) of a silicon dioxide ($SiO_2$) powder as being a material of silicon (Si), and 0.32 g (0.00026 mols of Zr) of a zirconium oxide ($ZrO_2$) powder as being a material of zirconium (Zr) were sufficiently well mixed.

Then, a mixture of these powders was filled inside an alumina container and was fired in an atmosphere of 3% hydrogen ($H_2$) plus 97% nitrogen ($N_2$) for 3 hours at 1500° C. After this firing, a phosphor obtained through a washing treatment and a dispersion treatment was provided as a phosphor of Sample 5-(3).

This phosphor of Sample 5-(3) is represented by a general formula: $3(Sr_{0.98}Eu_{0.0194}Yb_{0.0006})O \cdot (Si_{0.99922}Zr_{0.00078})O_2$. Here, y representing a ratio to substitute ytterbium (Yb) for a part of europium (Eu) is 0.03. In addition, z representing a ratio to substitute zirconium (Zr) for a part of silicon (Si) is 0.00078.

Similarly, phosphors were prepared under the same conditions as those of Sample 5-(3) except that z representing a ratio to substitute zirconium (Zr) for a part of silicon (Si) was changed to 0.00001, 0.0001, 0.0033, 0.01, 0.025, 0.054, 0.1, and 0.189 as shown in Table 9, and were provided as phosphors of Sample 5-(1), Sample 5-(2), and Sample 5-(4) to Sample 5-(9).

TABLE 9

| Sample | Zr substitution rate z | General Formula |
|---|---|---|
| Sample 5-(1) | 0.00001 | $3(Sr_{0.98}Eu_{0.0194}Yb_{0.0006})O \cdot (Si_{0.99999}Zr_{0.00001})O_2$ |
| Sample 5-(2) | 0.0001 | $3(Sr_{0.98}Eu_{0.0194}Yb_{0.0006})O \cdot (Si_{0.9999}Zr_{0.0001})O_2$ |
| Sample 5-(3) | 0.00078 | $3(Sr_{0.98}Eu_{0.0194}Yb_{0.0006})O \cdot (Si_{0.99922}Zr_{0.00078})O_2$ |
| Sample 5-(4) | 0.0033 | $3(Sr_{0.98}Eu_{0.0194}Yb_{0.0006})O \cdot (Si_{0.9967}Zr_{0.0033})O_2$ |
| Sample 5-(5) | 0.01 | $3(Sr_{0.98}Eu_{0.0194}Yb_{0.0006})O \cdot (Si_{0.99}Zr_{0.01})O_2$ |
| Sample 5-(6) | 0.025 | $3(Sr_{0.98}Eu_{0.0194}Yb_{0.0006})O \cdot (Si_{0.975}Zr_{0.025})O_2$ |
| Sample 5-(7) | 0.054 | $3(Sr_{0.98}Eu_{0.0194}Yb_{0.0006})O \cdot (Si_{0.946}Zr_{0.054})O_2$ |
| Sample 5-(8) | 0.1 | $3(Sr_{0.98}Eu_{0.0194}Yb_{0.0006})O \cdot (Si_{0.9}Zr_{0.1})O_2$ |
| Sample 5-(9) | 0.189 | $3(Sr_{0.98}Eu_{0.0194}Yb_{0.0006})O \cdot (Si_{0.811}Zr_{0.189})O_2$ |

Next, emission characteristics of the obtained phosphors of Sample 5-(1) to Sample 5-(9) were measured in the same manner as that of Example 1, and the results are shown in Table 10 as relative luminances to the luminance of Comparative Example 1 provided as 100.

TABLE 10

| Sample | Zr substitution rate z | Relative luminance |
|---|---|---|
| Comparative Example 1 | 0 | 100 |
| Sample 5-(1) | 0.00001 | 134 |
| Sample 5-(2) | 0.0001 | 137 |
| Sample 5-(3) | 0.00078 | 137 |
| Sample 5-(4) | 0.0033 | 135 |
| Sample 5-(5) | 0.01 | 131 |
| Sample 5-(6) | 0.025 | 125 |
| Sample 5-(7) | 0.054 | 116 |
| Sample 5-(8) | 0.1 | 106 |
| Sample 5-(9) | 0.189 | 94 |

As shown in Table 10, it is understood that, in the case of Sample 5-(1) to Sample 5-(8) where z representing a ratio to substitute zirconium (Zr) for a part of silicon (Si) is 0.00001 or more and 0.1 or less, the phosphors have excellent luminances in comparison with that of Comparative Example 1. Furthermore, it is understood that, in the case of Sample 5-(1) to Sample 5-(5) where z representing a ratio to substitute zirconium (Zr) for a part of silicon (Si) is 0.00001 or more and 0.01 or less, the luminances were particularly improved in comparison with that of Comparative Example 1.

By thus substituting zirconium (Zr) for a part of silicon (Si), an orange-emitting phosphor with a further high luminance can be manufactured.

Also, a preferred range of z representing a ratio to substitute zirconium (Zr) for a part of silicon (Si) is 0.00001 or more and 0.1 or less, and a further preferred range thereof is 0.00001 or more and 0.01 or less. In this case, at less than 0.00001, effects of zirconium (Zr) substituted for silicon (Si) are not displayed, and when the ratio exceeds 0.01, the luminance is lowered in comparison with that of a phosphor without substitution by zirconium (Zr).

In addition, characteristics of orange-emitting phosphors in the cases where germanium (Ge), tin (Sn), and titanium (Ti) being the same group 4 elements as zirconium (Zr) have been substituted for a part of silicon (Si) were also confirmed. The ratio to substitute each element was provided as 0.1. As element materials, oxides of the respective elements were used, and phosphors were prepared in the same manner as that of Sample 5-(1) to Sample 5-(9), and were provided as Sample 6 to Sample 8, respectively. Emission characteristics of these phosphors of Sample 6 to Sample 8 were also measured in the same manner as that of Example 1, and the results are shown in Table 11 as relative luminances to the luminance of Comparative Example 1 provided as 100.

TABLE 11

| Sample | Element to substitute | Ratio to substitute | Relative luminance |
|---|---|---|---|
| Comparative Example 1 | — | 0 | 100 |
| Sample 6 | Ge | 0.1 | 38 |
| Sample 7 | Sn | 0.1 | 45 |
| Sample 8 | Ti | 0.1 | 3 |

As Sample 6 where germanium (Ge) has been substituted for a part of silicon (Si) and Sample 7 where tin (Sn) has been substituted for a part of silicon (Si), the phosphors respectively had whitened body colors, and the luminance was considerably lowered. In addition, as Sample 8 where titanium (Ti) has been substituted for a part of silicon (Si), the phosphor changed the body color to red, and the luminance was significantly lowered.

Thus it is understood that, in the cases where similar elements other than zirconium (Zr) have been substituted for a part of silicon (Si), effects to improve the luminance are not obtained, and the luminance is lowered.

FIELD OF INDUSTRIAL APPLICATION

The orange-emitting phosphor of the present invention can construct a whitish visible light-emitting element, by combination with a light-emitting element that emits visible light rays or the like in a short wavelength region such as blue light rays, as a result of mixing between the visible light rays or the like in the short wavelength region such as blue light rays emitted by this light-emitting element and visible light rays on the long wavelength side fluorescently emitted by the orange-emitting phosphor.

Furthermore, by using a light-emitting diode or a laser diode or the like as this light-emitting element to be combined with the orange-emitting phosphor, an excellent whitish visible light-emitting element with a higher luminance can be constructed.

Moreover, these whitish visible light-emitting elements can be widely used as light-emitting sources of image display devices or lighting systems since these are small in the amount of power consumption and have long lifespans. In particular, by using the orange-emitting phosphor of the present invention for a whitish visible light-emitting element such as a white light-emitting diode, light in the orange region to the red region can be supplemented to improve color rendering properties, and thus this can be used also for purposes such as illumination.

What is claimed is:

1. An orange-emitting phosphor represented by a general formula of $a(Sr_{1-x}Eu_{x(1-y)}Yb_{xy})O \cdot (Si_{(1-z)}Zr_z)O_2$, wherein a is $2.9 \leq a \leq 3.1$,
x is $0.005 \leq x \leq 0.1$,
y is $0.001 \leq y \leq 0.1$, and
z is $0.00001 \leq z \leq 0.01$, and
wherein Europium (Eu) is divalent ($Eu^{2+}$) and Ytterbium (Yb) is divalent ($Yb^{2+}$).

2. A manufacturing method for an orange-emitting phosphor represented by a general formula of $a(Sr_{1-x}Eu_{x(1-y)}Yb_{xy})O \cdot SiO_2$, wherein a is $2.9 \leq a \leq 3.1$,
x is $0.005 \leq x \leq 0.1$,
y is $0.001 \leq y \leq 0.1$, and
wherein Europium (Eu) is divalent ($Eu^{2+}$) and Ytterbium (Yb) is divalent ($Yb^{2+}$), Silicon Nitride ($Si_3N_4$) is used as a part of a material of Silicon (Si), and firing is performed at 1500° C. or more in a reducing atmosphere.

3. The manufacturing method for an orange-emitting phosphor according to claim 2, wherein a ratio of Si atoms by $Si_3N_4$ to the amount of all Si atoms as being raw material is 30 mol % or more and 70 mol % or less.

4. An orange-emitting phosphor represented by a general formula of $a(Sr_{1-x}Eu_{x(1-y)}Yb_{xy})O \cdot (Si_{(1-z)}Zr_z)O_2$, wherein a is $2.9 \leq a \leq 3.1$,
x is $0.005 \leq x \leq 0.1$,
y is $0.001 \leq y \leq 0.1$, and
z is $0.00001 \leq z \leq 0.01$, and
wherein Europium (Eu) is divalent ($Eu^{2+}$) and Ytterbium (Yb) is divalent ($Yb^{2+}$), Silicon Nitride ($Si_3N_4$) is used as a part of a material of Silicon (Si), and firing is performed at 1500° C. or more in a reducing atmosphere.

5. The manufacturing method for an orange-emitting phosphor according to claim 4, wherein a ratio of Si atoms by $Si_3N_4$ to the amount of all Si atoms as being raw material is 30 mol % or more and 70 mol % or less.

* * * * *